No Printed Specification Available
7825X W. MITCHELL.
STRAW CUTTER.
Patented Nov. 19, 1833.
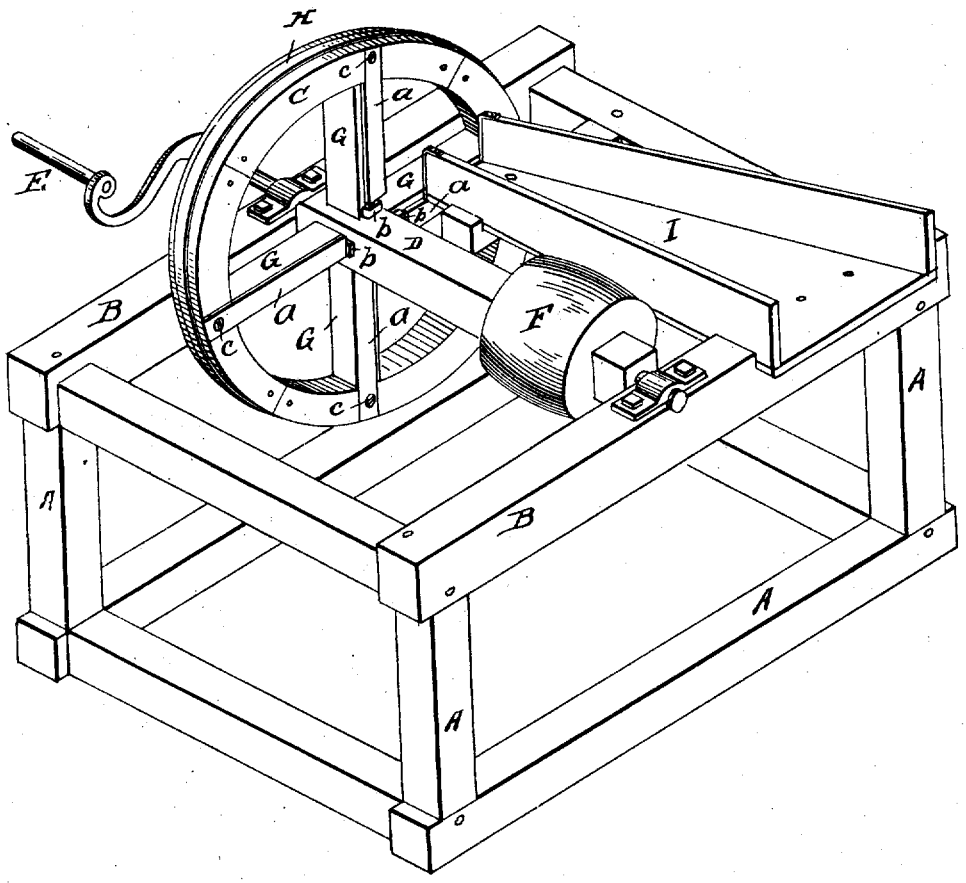

7825X Nov 19. 1833

William Mitchell of Anderson District S Carolina

Letters Patent. Patented Nov. 19th 1833.

The Schedule referred to in these Letters Patent, and making part of the same, containing a description in the words of the said William Mitchell himself of his improvement in the Straw cutter.

To all to whom these presents shall come: Be it Known that I William Mitchell of Anderson District, in the State of South Carolina, have invented a new and useful improvement in Straw cutting; and that the following is a full and exact description of the construction and operation of . . said machine as invented by me.

1st A frame five feet long by three feet broad and two & a half feet high from the lower to the upper surface. All the timbers of which, should be four inches square except the two upper side rails (see model No 242.) which should be six inches by four. –

2nd A Wheel of wood or cast iron three feet in diameter, with a cylinder thro' it, three feet in length extending from one of the upper side rails of the frame to the other and turning on the same, to one end of which is attached the crank or handle and have the other end of the cylinder but within the frame is is a pulley, by adding a band to which a horse power may be applied; conducting the machine at the same time to other machines. – By means of the crank, Horse power may be dispensed with and the hand alone used. – The arms for the wheel must be four in number, four inches by two, and running thro' the cylinder before mentioned, the size of which should be four inches square. The rim or fellies for the wheel must be three inches square, with a small band of hoop iron around it, if it is made of wood. – To the side of the wheel next the pulley are fastened four knives or blades each extending from the rim or fellies to the arms at equal distances, one end of the knife . . to be fastened to the arm by a staple and the other end fastened to the rim or fellies by a screw. – The knife 244. 7825X to be of the common cutting knife, and let into the fellies its thick-
ness on the back of the knife, its edge projecting a little out, one
end of the knife extending to the outer surface of the wheel and
the other end made somewhat after the form of a tenon to go in
-to the staple. on each . . . . . . . arm above the cylinder 3<sup>d</sup> A Boxn hopper eighteen . . inches in width and six
in depth at one end and tapering so as to make a width of six
inches and a ~~depth~~ of four inches at the other end. which
is to be plated with steel; against which the blades are to
act. The hopper extends in a horizontal position from
the railing of the frame into which it is let in by a mortice
to the wheel. The other end of the hopper resting on a cross
piece or cylinder running parallel with the railing. If
it is made of cast iron the wheel and cylinder should be
all cast together. — When used by hand two pinions are
required, when a horse is used one only is necessary.

Exd. Witnesses
W.J.C. Nathaniel Hughes }
Samuel Donald }

William Mitchell (624 Words)

Received and Recorded anew, November, seventh 1837. —

Drawing Made